United States Patent
Guo et al.

(10) Patent No.: US 12,332,150 B1
(45) Date of Patent: Jun. 17, 2025

(54) VENTILATION TEST DEVICE AND METHOD FOR PLASTIC PARTS OF COFFEE MACHINE

(71) Applicant: Jiangsu Vnuo Certification and Testing Co., Ltd., Jiangsu (CN)

(72) Inventors: Pengliang Guo, Jiangsu (CN); Xin He, Jiangsu (CN); Lingquan Xiang, Jiangsu (CN); Dongqi Wang, Jiangsu (CN); Jianxin Hu, Jiangsu (CN)

(73) Assignee: Jiangsu Vnuo Certification and Testing Co., Ltd., Suqian (CN)

( * ) Notice: Subject to any disclaimer, the term of this patent is extended or adjusted under 35 U.S.C. 154(b) by 0 days.

(21) Appl. No.: 19/076,965

(22) Filed: Mar. 11, 2025

(30) Foreign Application Priority Data

Mar. 29, 2024 (CN) .......................... 202410374617.3

(51) Int. Cl.
*G01M 99/00* (2011.01)
(52) U.S. Cl.
CPC ................................ *G01M 99/005* (2013.01)
(58) Field of Classification Search
CPC ................................................ G01M 99/005
See application file for complete search history.

(56) References Cited

U.S. PATENT DOCUMENTS

2017/0052088 A1   2/2017   Beuk et al.

FOREIGN PATENT DOCUMENTS

| CN | 106441723 A | * | 2/2017 | |
| CN | 110398318 A | * | 11/2019 | ............. G01M 3/02 |
| CN | 110702334 A | | 1/2020 | |
| CN | 112504570 A | * | 3/2021 | ............. G01M 3/08 |
| CN | 214843968 U | | 11/2021 | |
| CN | 114993563 A | * | 9/2022 | |
| CN | 116642647 A | * | 8/2023 | |
| CN | 219956817 U | | 11/2023 | |
| WO | 2020100171 A1 | | 5/2020 | |

* cited by examiner

*Primary Examiner* — Natalie Huls (57) ABSTRACT

Disclosed are a ventilation test device and method for plastic parts of a coffee machine. The device includes a device body, a detection assembly on a top of the device body, gas delivery pipes on a top of the detection assembly, electric telescopic columns, and a pressing plate on tops of telescopic ends of the electric telescopic columns. Circular holes are formed in the pressing plate, telescopic rings are fixedly mounted at a bottom of the pressing plate, and the telescopic rings are located around peripheries of the circular holes. Downstream devices for identifying ventilation types are arranged inside the gas delivery pipes, annular inclined plates are arranged on the pressing plate, the annular inclined plates are distributed around peripheries of tops of the circular holes, and a U-shaped frame is hingedly connected to a top of an inclined plate in each of the annular inclined plates.

3 Claims, 9 Drawing Sheets

FIG. 9 ized, the telescopic end of the electric telescopic rotating column drives the elliptical assembly to rotate and move up and down, and the elliptical assembly stirs the material internally.

VENTILATION TEST DEVICE AND METHOD FOR PLASTIC PARTS OF COFFEE MACHINE

CROSS-REFERENCE TO RELATED APPLICATION

This application claims priority of Chinese Patent Application No. 202410374617.3, filed on Mar. 29, 2024, the entire contents of which are incorporated herein by reference.

TECHNICAL FIELD

The present disclosure relates to the technical field of plastic part ventilation, and particularly relates to a ventilation test device and method for plastic parts of a coffee machine.

BACKGROUND

With the development of the times, coffee has become an indispensable beverage for people in daily life. However, many sets of plastic parts are required for making a coffee machine, and many pipe passages in the plastic parts of the coffee machine easily cause blockage, such that the coffee machine easily fails to make coffee normally.

The patent CN214843968U discloses a ventilation test device for plastic parts of a coffee machine, and the device includes a gas collecting box, a workbench and a pressure test gauge. A gas delivery conduit is arranged on the workbench, one end of the gas delivery conduit on the workbench is connected with the gas collecting box through a first gas delivery pipe, the other end thereof is connected with a mounting pipe configured for installing plastic parts of the coffee machine, the workbench is further provided with a gas exhaust channel connected with the gas delivery conduit, and the pressure test gauge is connected with an outlet of the gas exhaust channel. Before the plastic parts of the coffee machine are mounted on the mounting pipe, the gas collecting box is used to ventilate the mounting pipe. Reading of the pressure test gauge is observed, the plastic parts of the coffee machine are mounted on the mounting pipe, the gas collecting box is used to ventilate the plastic parts of the coffee machine, and the reading of the pressure test gauge is observed. Whether the plastic part of the coffee machine is blocked or not can be determined by checking whether the pressure test gauge displays the same reading on both sides of the plastic part of the coffee machine.

However, the device still has some defects at present: the device detects whether a material is blocked through air pressure reading, but a tester needs to hold the material for ventilation detection during detection, which increases workload of the tester, reduces detection efficiency, hardly achieves automatic insertion for ventilation detection, and increases the workload and muscle fatigue of the tester to a certain extent.

SUMMARY

In order to overcome the defects of the prior art, the present disclosure provides a ventilation test device and method for plastic parts of a coffee machine, which solves the technical problems mentioned in the above Background.

In order to achieve the above objective, the present disclosure is achieved by the following technical solution: a ventilation test device and method for plastic parts of a coffee machine, including a device body, where a detection assembly is arranged at a center of a top of the device body, gas delivery pipes are equidistantly distributed on a top of the detection assembly, electric telescopic columns are arranged on left and right sides of the top of the device body, and a pressing plate is arranged on tops of telescopic ends of the electric telescopic columns; circular holes are formed in the pressing plate, telescopic rings are fixedly mounted at a bottom of the pressing plate, and the telescopic rings are located around peripheries of the circular holes; and downstream devices for identifying ventilation types are arranged inside the gas delivery pipes, the electric telescopic columns drive the pressing plate and the material to be grafted to the gas delivery pipes for ventilation detection, a material to be tested is placed at a circular hole of the pressing plate, and telescopic characteristics of the telescopic rings are used for limiting.

According to the above technical solution, annular inclined plates are arranged on a top of the pressing plate, the annular inclined plates are distributed around peripheries of tops of the circular holes, a U-shaped frame is hingedly connected to a top of an inclined plate in each of the annular inclined plates, a friction wheel is rotatably mounted inside the U-shaped frame, and spring plates are arranged on an inclined surface of the inclined plates in each of the annular inclined plates and at edges of the corresponding circular hole on the top of the pressing plate. Before the material enters the circular hole of the pressing plate, the material first contacts the friction wheels, and the friction wheels drive the U-shaped frames to deflect downward. When the material continues to descend, the material contacts the inclined plates in the annular inclined plate, and combined action of a plurality of the inclined plates causes the material to drop vertically to the gas delivery pipes. The annular inclined plate drives the spring plates to deform, and the spring plates deform in a direction close to an outer wall of the material for clamping.

According to the above technical solution, each of the downstream devices includes a filter plate, an electric telescopic rotating column, and an elliptical assembly, where an outer wall of the filter plate is fixedly mounted on an inner wall of the gas delivery pipe, a bottom of the electric telescopic rotating column is rotatably mounted at a center of a top of the filter plate, and a top arc surface of the elliptical assembly is hingedly connected to an outer wall surface of a telescopic end of the electric telescopic rotating column; the elliptical assembly is located directly below the corresponding circular hole of the pressing plate, and an anti-clogging device for preventing airflow obstruction is arranged below the filter plate. The filter plate is configured to block the dirt that falls due to stirring by the elliptical assembly. When the electric telescopic rotating column is activated, the telescopic end of the electric telescopic rotating column drives the elliptical assembly to rotate and move up and down, and the elliptical assembly stirs the material internally.

According to the above technical solution, the downstream device further includes a twisted plate, an elastic ring, a transmission rod and a groove block, where a top of the twisted plate is fixedly mounted on a bottom arc surface of the elliptical assembly, inside of the elastic ring is slidably mounted on an outer wall of the electric telescopic rotating column, an outer wall of the elastic ring is fixedly connected to a bottom of the twisted plate, a bottom of the transmission rod is hingedly connected to a concave surface of the twisted plate, an arc surface of an outer wall of the groove block is hingedly connected to a top of the transmission rod, and a concave surface of an inner wall of the groove block is in contact with an outer wall of the telescopic end of the electric telescopic rotating column. When a centrifugal force of rotating causes the elliptical assembly to rotate at an angle horizontal to the ground, the twisted plate is pulled to move upward, and the twisted plate pulls the elastic ring to move synchronously. When the twisted plate moves up and down, the transmission rod is driven to move synchronously, and the transmission rod drives the groove block to slide synchronously along the outer wall of the telescopic end of the electric telescopic rotating column.

According to the above technical solution, the anti-clogging device includes an arc groove column, a connecting rod and a heating ring, where a top of the arc groove column penetrates through and is fixedly mounted at the bottom of the electric telescopic rotating column, a right side of the connecting rod is slidably mounted inside an arc groove of the arc groove column, an outer wall of the heating ring is slidably mounted on the inner wall of the corresponding gas delivery pipe, a concave surface of an inner wall of the heating ring is fixedly mounted on a left side of the connecting rod, and a crack detection device for detecting quality of the material is arranged above an outer wall of the gas delivery pipe. The electric telescopic rotating column drives the arc groove column to rotate, the arc groove column limits the connecting rod through its own arc groove and causes the connecting rod to move up and down, and the connecting rod drives the heating ring to move synchronously.

According to the above technical solution, the anti-clogging device further includes fixed plates, conical blocks, telescopic bearing plates and arc-shaped sheets, where a top of each of the fixed plates is fixedly mounted at a bottom of the heating ring, a bottom of each of the conical blocks is fixedly mounted on a top of the corresponding fixed plate, a top of each of the conical blocks is directly opposite to a filter hole of the corresponding filter plate, a top of each of the telescopic bearing plates is fixedly mounted at a bottom of the corresponding fixed plate, and a top of each of the arc-shaped sheets is fixedly mounted at a bottom of a telescopic end of the corresponding telescopic bearing plate. The heating ring drives the fixed plates to move up and down, the fixed plates drive the conical blocks to move synchronously, the fixed plate drives the telescopic bearing plate to move, and the telescopic bearing plate receives fallen dirt. The telescopic bearing plate drives the arc-shaped sheet to move synchronously, and the arc-shaped sheet deforms due to an impact force of air pressure.

According to the above technical solution, the crack detection device includes a telescopic housing, an elastic arc plate and a purification capsule, wherein an inner wall of a bottom of the telescopic housing is fixedly mounted above the outer wall of the corresponding gas delivery pipe, a telescopic end of the telescopic housing is located on a motion trajectory of the pressing plate, the telescopic housing is designed to be transparent, and the telescopic housing is communicated with the gas delivery pipe; a back of the elastic arc plate is fixedly mounted between a front face of the telescopic housing and a front face of the telescopic end of the telescopic housing, and the purification capsule is fixedly mounted between the front face of the telescopic housing and a concave surface of the elastic arc plate. The pressing plate abuts against the telescopic end of the telescopic housing when descending to form a sealed environment, the telescopic housing, when retracting downward, compresses the elastic arc plate to deform in a direction away from the telescopic housing, the elastic arc plate, when deforming, pulls the purification capsule to deform synchronously and store force, and at the time of resetting, the purification capsule discharges purified gases such as ozone through an extrusion force.

According to the above technical solution, the crack detection device further includes L-shaped pressing levers, spoiler plates, vibration blocks and angular blocks, where a left side of a top of each of the L-shaped pressing levers is fixedly mounted on a left side of an inner wall of the telescopic end of the telescopic housing, a left side of each of the spoiler plates is fixedly mounted on the left side of the inner wall of the telescopic housing, each of the spoiler plates is located on a motion trajectory of the corresponding L-shaped pressing lever, a bottom of each of the vibration blocks is fixedly mounted at a top edge of the corresponding spoiler plate, and a top of each of the angular blocks is fixedly mounted at a bottom of the corresponding spoiler plate. The telescopic end of the telescopic housing drives the L-shaped pressing lever to move synchronously, and the L-shaped pressing lever moves downward to abut against one end of the spoiler plate, which causes the abutted end of the spoiler plate to bend downward and deform. The spoiler plate drives the angular block to swing, and the angular block dredges gas carrying water vapor and accumulated at a bottom of inside of the telescopic housing due to temperature differences through angular inclined surfaces.

A test method for the ventilation test device for plastic parts of a coffee machine includes the following steps:

S1: putting the material into the corresponding circular hole on the top of the pressing plate, and activating the electric telescopic columns, such that the telescopic ends of the electric telescopic columns drive the pressing plate and the material to descend;

S2: enabling the material to abut against the spring plate when passing through the circular hole of the pressing plate, where the material continues to descend after the spring plate deforms;

S3: activating the detection assembly when the material descends to the gas delivery pipe, where the detection assembly delivers gas to inside of the gas delivery pipe and displays a value; and S4: driving the pressing plate to move upward when the telescopic end of the electric telescopic column rises after the ventilation, where the spring plate carries the material away from the gas delivery pipe to complete the detection.

The ventilation test device and method for plastic parts of a coffee machine provided by the present disclosure have the following beneficial effects:

(1) In the present disclosure, arrangement of an anti-offset device and cooperation of the electric telescopic column, the pressing plate and the telescopic ring enable that the telescopic rings limit materials of different sizes within a diameter of the circular hole and drive the material to be grafted to the gas delivery pipes for ventilation detection, which reduces manual intervention, improves detection efficiency, and relieves muscle fatigue of a worker; cooperation of the annular inclined plate, the U-shaped frame, the friction wheel and the spring plate enables that the friction wheel removes dirt adhered to the outer wall of the material, which prevents any unevenness of the material caused by adhesion of substances to the outer wall thereof, thereby ensuring smoothness of entry into the circular hole; the annular inclined plate causes the material to drop vertically to the gas delivery pipes to avoid deviation and gas leakage; and a clamping force exerted by the spring plates prevents shaking of the material caused by excessive air pressure injection on an original basis, which prevents the material from leaving the gas delivery pipes and reduces accidental occurrences during testing.

(2) In the present disclosure, arrangement of the downstream devices and cooperation of the filter plate, the electric telescopic rotating column and the elliptical assembly enable that the elliptical assembly can stir the material internally to prevent adhesion of dirt to an inner wall of the material caused by external factors and ensure gas flowability, and the elliptical assembly identifies a ventilation type of the material to avoid waste of finished products; cooperation of the twisted plate, the elastic ring, the transmission rod and the groove block enables that the twisted plate pulls the elastic ring to shield a connection interface of the telescopic end of the electric telescopic rotating column so as to prevent solid particles from getting stuck, and to prevent reducing efficiency of identifying a ventilation type of the material due to difficulty of extending and retracting the electric telescopic rotating column; and when the groove block slides in a reciprocating manner, substances adhered to the outer wall of the telescopic end of the electric telescopic rotating column are raked to prevent long-term adhesion of plastic parts from corroding the electric telescopic rotating column, thereby ensuring cleanliness of the electric telescopic rotating column.

(3) In the present disclosure, arrangement of the anti-clogging device and cooperation of the electric telescopic rotating column, the arc groove column, the connecting rod and the heating ring enable that the heating ring dynamically heats to accelerate a gas heating rate, and dries water vapor carried in the material by heat energy to prevent water droplets from adhering to the inner wall of the material so as to avoid increasing gas flow resistance and reducing detection accuracy; cooperation of the fixed plate, the conical block, the telescopic bearing plate and the arc-shaped sheet enables that the conical block dredges a filter hole of the filter plate through a conical surface to avoid reducing a gas flow aperture due to adhesion of dirt to the filter hole of the filter plate; the telescopic bearing plate prevents tiny dirt from entering the gas delivery pipe through the filter plate so as to avoid blockage of the gas delivery pipe, thereby extending an equipment maintenance interval; and the arc-shaped sheet pulls the telescopic end of the telescopic bearing plate to move from left to right, and the telescopic end of the telescopic bearing plate rakes the dirt in a reciprocating manner, which avoids accumulating the dirt in a center thereof and reducing a volume of the telescopic bearing plate.

(4) In the present disclosure, arrangement of the crack detection device and cooperation of the pressing plate, the telescopic housing, the elastic arc plate and the purification capsule enable that the telescopic housing senses gas, whether gap leakage in the material is detected, and fragments generated from material bursting due to excessive pressure are blocked, thereby avoiding damage to vulnerable parts of the worker such as eyes; the purification capsule discharges purified gases to neutralize harmful gases generated by heat energy of the plastic parts, thereby avoiding harm to the respiratory system of the worker; cooperation of the L-shaped pressing lever, the spoiler plate, the vibration block and the angular block enables that the vibration blocks increase a swinging frequency of the spoiler plates, and the spoiler plates accelerate gas circulation inside the telescopic housing, which accelerates neutralization of harmful gases and purified gases; and the angular block dredges gas carrying water vapor and accumulated at a bottom of inside of the telescopic housing due to temperature differences through angular inclined surfaces, which prevents long-time accumulation of the gas, thereby avoiding aggravated fermentation of harmful substances, and avoids aggravation of environmental pollution.

Reference numerals in the FIGURES: 1. device body; 2. detection assembly; 3. gas delivery pipe; 4. downstream device; 41. filter plate; 42. electric telescopic rotating column; 43. elliptical assembly; 44. twisted plate; 45. elastic ring; 46. transmission rod; 47. groove block; 5. anti-clogging device; 51. arc groove column; 52. connecting rod; 53. heating ring; 54. fixed plate; 55. conical block; 56. telescopic bearing plate; 57. arc-shaped sheet; 6. crack detection device; 61. telescopic housing; 62. elastic arc plate; 63. purification capsule; 64. L-shaped pressing lever; 65. spoiler plate; 66. vibration block; 67. angular block; 7. electric telescopic column; 8. pressing plate; 9. telescopic ring; 10. annular inclined plate; 11. U-shaped frame; 12. friction wheel; and 13. spring plate.

DETAILED DESCRIPTIONS OF THE EMBODIMENTS

The technical solutions in the examples of the present disclosure will be clearly and completely described below in combination with the accompanying drawings in the examples of the present disclosure. Apparently, the examples described are merely some rather than all of the examples of the present disclosure.

Figure 1:
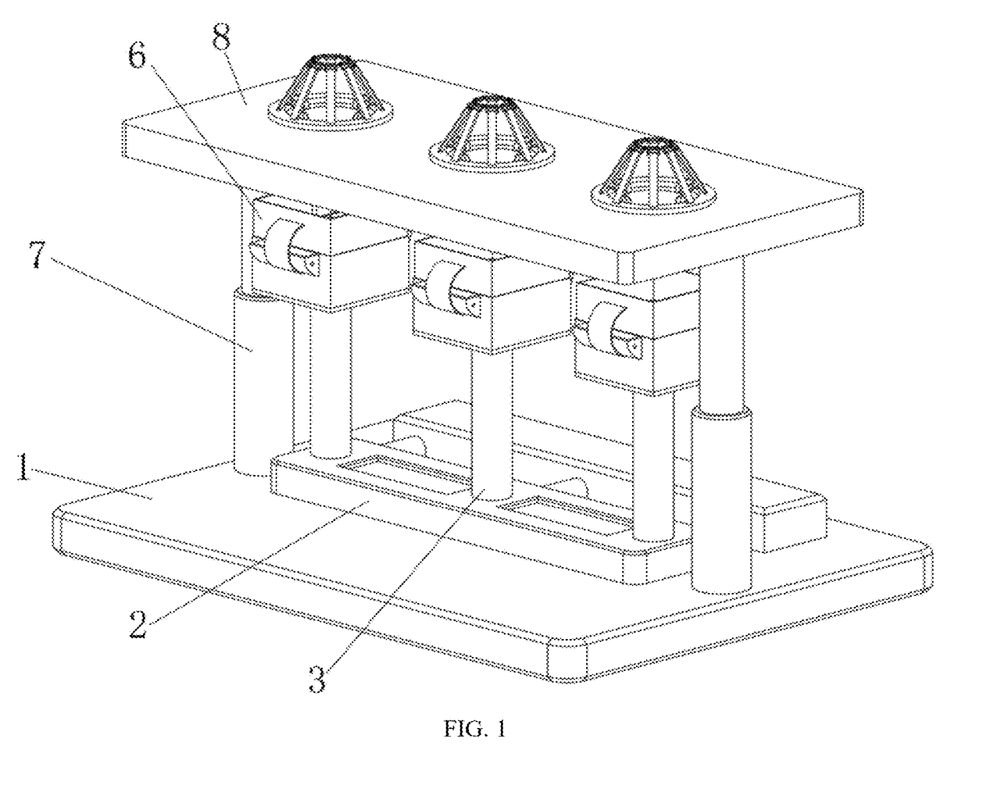
FIG. 1 is an overall schematic diagram of the present disclosure.
Figure 2:
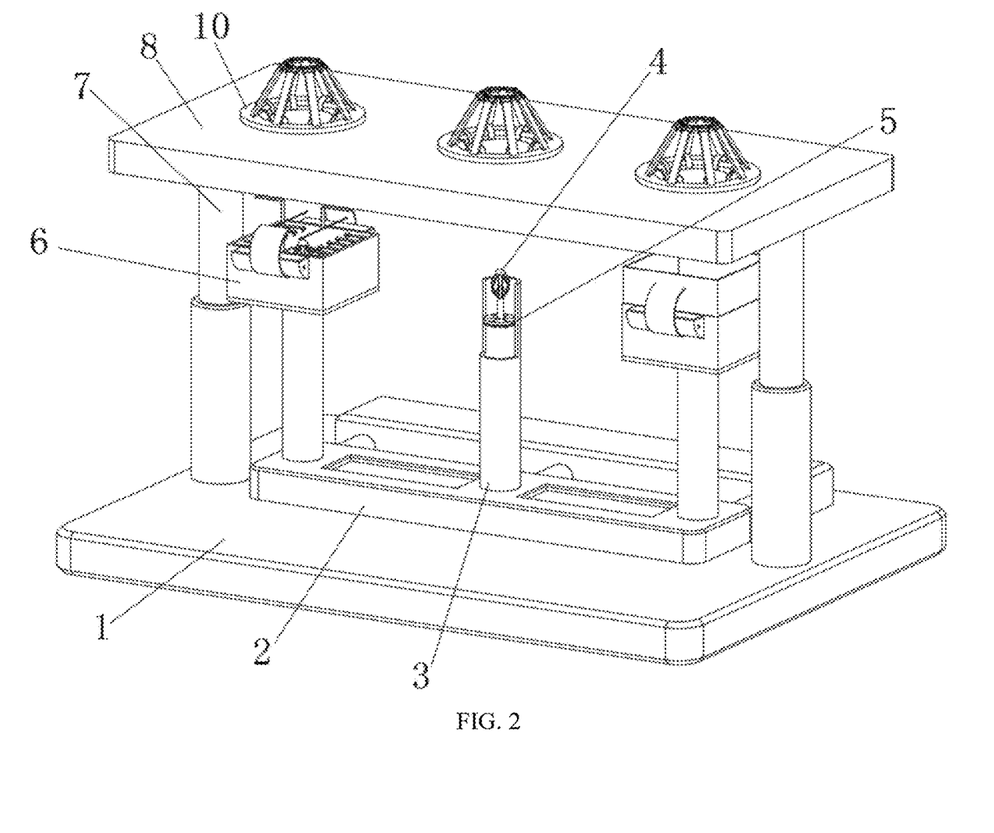
FIG. 2 is an overall schematic diagram of an internal structure of the present disclosure.
Figure 3:
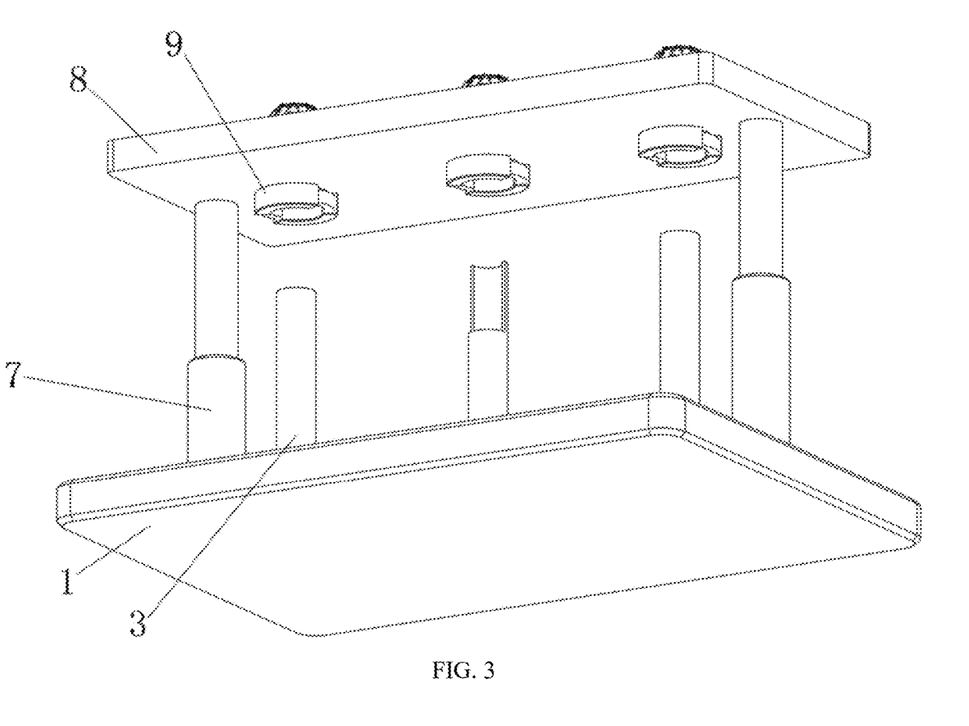
FIG. 3 is a schematic diagram of an anti-offset device of the present disclosure.
Figure 4:
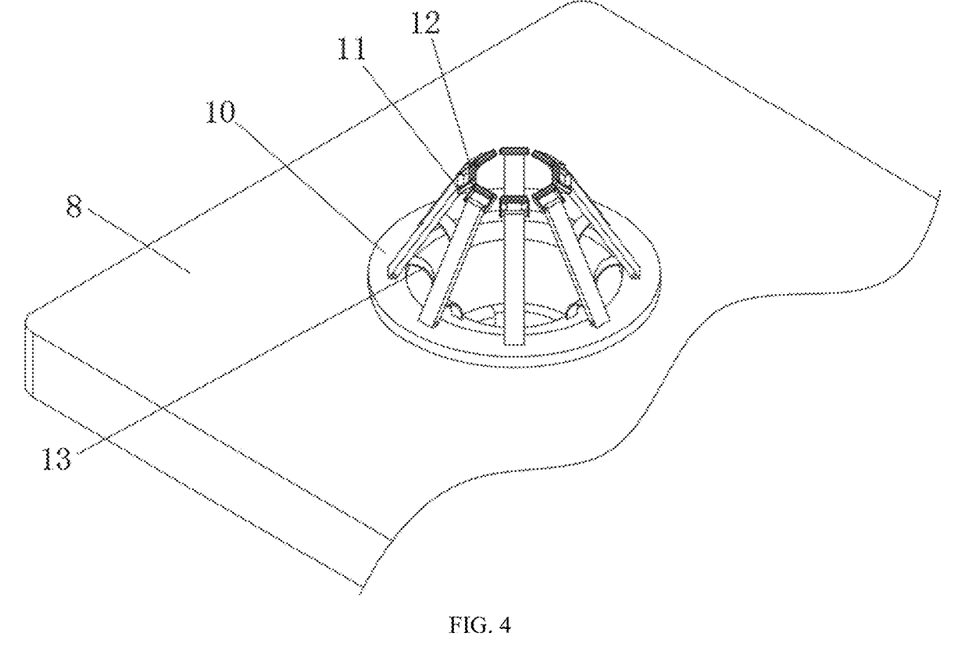
FIG. 4 is an enlarged view of a partial structure of an anti-offset device of the present disclosure.

With reference to FIGS. 1-9, an example of the present disclosure is as follows: a ventilation test device and method for plastic parts of a coffee machine includes a device body 1, a detection assembly 2 is arranged at a center of a top of the device body 1, gas delivery pipes 3 are equidistantly distributed on a top of the detection assembly 2, electric telescopic columns 7 are arranged on left and right sides of the top of the device body 1, and a pressing plate 8 is arranged on tops of telescopic ends of the electric telescopic columns 7; circular holes are formed in the pressing plate 8, telescopic rings 9 are fixedly mounted at a bottom of the pressing plate 8, and the telescopic rings 9 are located around peripheries of the circular holes; downstream devices 4 for identifying ventilation types are arranged inside the gas delivery pipes 3 and limited by telescopic characteristics of the telescopic rings 9; and the electric telescopic columns 7 drive the pressing plate 8 and a material to be grafted to the gas delivery pipes 3 for ventilation detection, and different air pressures are set through the detection assembly 2 for detection and display of values.

annular inclined plates 10 are arranged on a top of the pressing plate 8, the annular inclined plates 10 are distributed around peripheries of tops of the circular holes, a U-shaped frame 11 is hingedly connected to a top of an inclined plate in each of the annular inclined plates 10, and a friction wheel 12 is rotatably mounted inside the U-shaped frame 11; spring plates 13 are arranged on an inclined surface of the inclined plates in each of the annular inclined plates 10 and at edges of the corresponding circular hole on the top of the pressing plate 8, a friction force causes the friction wheel 12 to generate a rotational force and start to rotate, and when the friction wheel 12 rotates, dirt adhered to an outer wall of the material is removed; and combined action of a plurality of the inclined plates causes the material to drop vertically to the gas delivery pipes 3 to avoid deviation and gas leakage, the spring plates 13 deform in a direction close to the outer wall of the material for clamping, and a clamping force exerted by the spring plates 13 prevents shaking of the material caused by excessive air pressure injection on an original basis.

Figure 5:
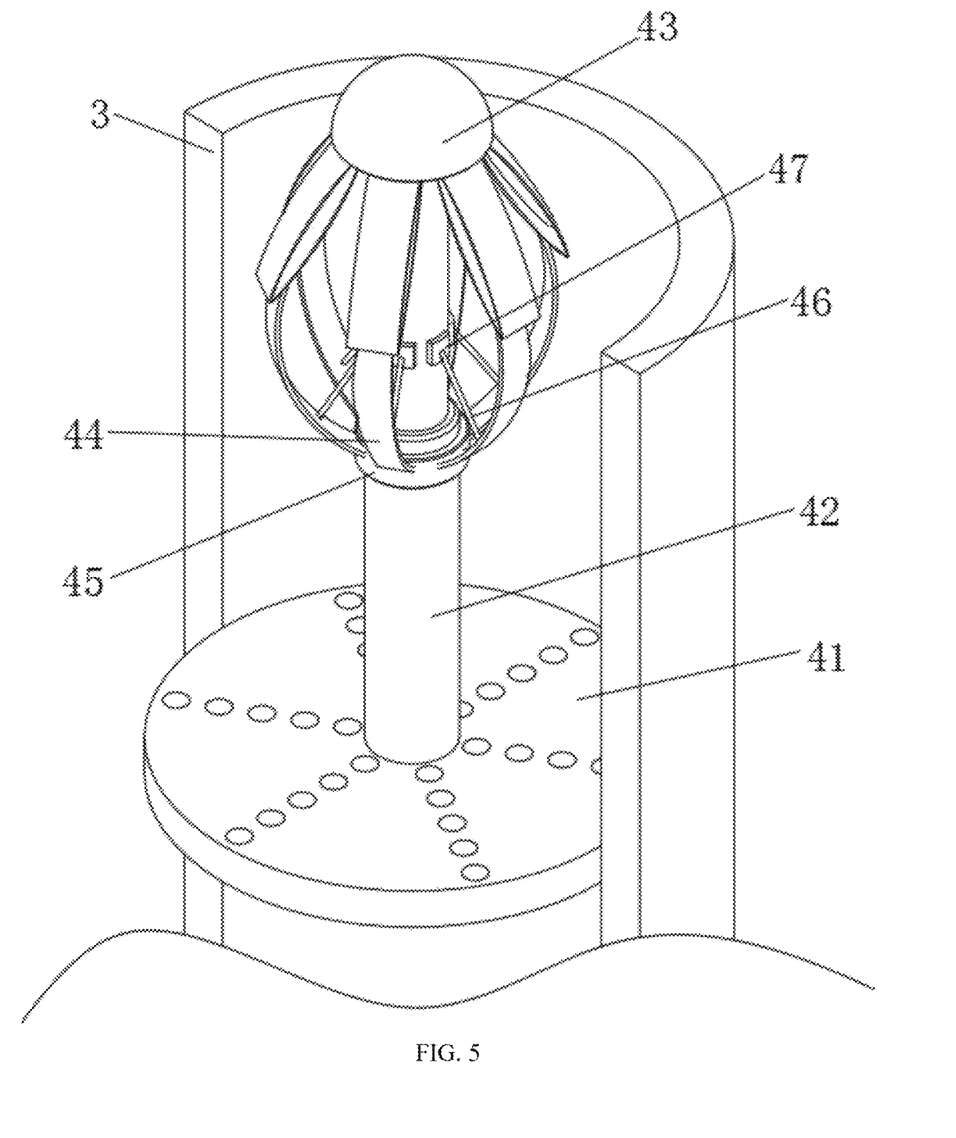
FIG. 5 is a schematic diagram of a downstream device of the present disclosure.

Each of the downstream devices 4 includes a filter plate 41, an electric telescopic rotating column 42, and an elliptical assembly 43, where an outer wall of the filter plate 41 is fixedly mounted on an inner wall of the gas delivery pipe 3, a bottom of the electric telescopic rotating column 42 is rotatably mounted at a center of a top of the filter plate 41, and a top arc surface of the elliptical assembly 43 is hingedly connected to an outer wall surface of a telescopic end of the electric telescopic rotating column 42; and the elliptical assembly 43 is located directly below the corresponding circular hole of the pressing plate 8, an anti-clogging device 5 for preventing airflow obstruction is arranged below the filter plate 41, the elliptical assembly 43 identifies a ventilation type of the material to avoid waste of finished products, and the filter plate 41 is configured to block the dirt that falls due to stirring by the elliptical assembly 43.

The downstream device 4 further includes a twisted plate 44, an elastic ring 45, a transmission rod 46 and a groove block 47, where a top of the twisted plate 44 is fixedly mounted on a bottom arc surface of the elliptical assembly 43, inside of the elastic ring 45 is slidably mounted on an outer wall of the electric telescopic rotating column 42, an outer wall of the elastic ring 45 is fixedly connected to a bottom of the twisted plate 44, a bottom of the transmission rod 46 is hingedly connected to a concave surface of the twisted plate 44, an arc surface of an outer wall of the groove block 47 is hingedly connected to a top of the transmission rod 46, a concave surface of an inner wall of the groove block 47 is in contact with an outer wall of the telescopic end of the electric telescopic rotating column 42, the twisted plate 44 pulls the elastic ring 45 to move synchronously to shield a connection interface of the telescopic end of the electric telescopic rotating column 42 so as to prevent solid particles from getting stuck in the telescopic end and causing damage, and when the groove block 47 slides in a reciprocating manner, substances adhered to the outer wall of the telescopic end of the electric telescopic rotating column 42 are raked to prevent long-term adhesion of plastic parts from corroding the electric telescopic rotating column 42.

In use, a material to be tested is placed at a circular hole of the pressing plate 8, telescopic characteristics of the telescopic rings 9 enable the telescopic rings 9 to limit materials of different sizes within a diameter of the circular hole, when the electric telescopic columns 7 are activated, the electric telescopic columns 7 drive the pressing plate 8 and the material to be grafted to the gas delivery pipes 3 for ventilation detection, and different air pressures are set through the detection assembly 2 for detection and display of values, which reduces manual intervention, improves detection efficiency, and relieves muscle fatigue of a worker; before the material enters the circular hole of the pressing plate 8, the material first contacts the friction wheels 12, the friction wheels 12 drive the U-shaped frames 11 to deflect downward, a friction force causes the friction wheel 12 to generate a rotational force and start to rotate, and when the friction wheel 12 rotates, and dirt adhered to an outer wall of the material is removed, which prevents any unevenness of the material caused by adhesion of substances to the outer wall thereof, thereby ensuring smoothness of entry into the circular hole; when the material continues to descend, the material contacts the inclined plates in the annular inclined plate 10, and combined action of a plurality of the inclined plates causes the material to drop vertically to the gas delivery pipes 3 to avoid deviation and gas leakage, thereby preventing errors in detection results; and when approaching the outer wall of the material under the action of the friction force of the material, the annular inclined plate 10 drives the spring plates 13 to deform, the spring plates 13 deform in a direction close to the outer wall of the material for clamping, and a clamping force exerted by the spring plates 13 prevents shaking of the material caused by excessive air pressure injection on an original basis, which prevents the material from leaving the gas delivery pipes 3 and reduces accidental occurrences during testing.

When the electric telescopic rotating column 42 is activated, the telescopic end of the electric telescopic rotating column 42 drives the elliptical assembly 43 to rotate and move up and down, the elliptical assembly 43 stirs the material internally to prevent adhesion of dirt to an inner wall of the material caused by external factors and ensure gas flowability, and the elliptical assembly 43 identifies a ventilation type of the material to avoid waste of finished products; the filter plate 41 is configured to block the dirt that falls due to stirring by the elliptical assembly 43; when a centrifugal force of rotating causes the elliptical assembly 43 to rotate at an angle horizontal to the ground, the twisted plate 44 is pulled to move upward, and the twisted plate 44 pulls the elastic ring 45 to move synchronously to shield the connection interface of the telescopic end of the electric telescopic rotating column 42 so as to prevent solid particles from getting stuck in the telescopic end and causing damage, and to prevent reducing efficiency of identifying a ventilation type of the material due to difficulty of extending and retracting the electric telescopic rotating column 42; and when the twisted plate 44 moves up and down, the transmission rod 46 is driven to move synchronously, the transmission rod 46 drives the groove block 47 to slide synchronously along the outer wall of the telescopic end of the electric telescopic rotating column 42, and when the groove block 47 slides in a reciprocating manner, substances adhered to the outer wall of the telescopic end of the electric telescopic rotating column 42 are raked to prevent long-term adhesion of plastic parts from corroding the electric telescopic rotating column 42, thereby ensuring cleanliness of the electric telescopic rotating column 42.

With reference to FIGS. 1-9, in another example of the present disclosure based on the above example, the anti-clogging device 5 and a crack detection device 6 are further included.

Figure 6:
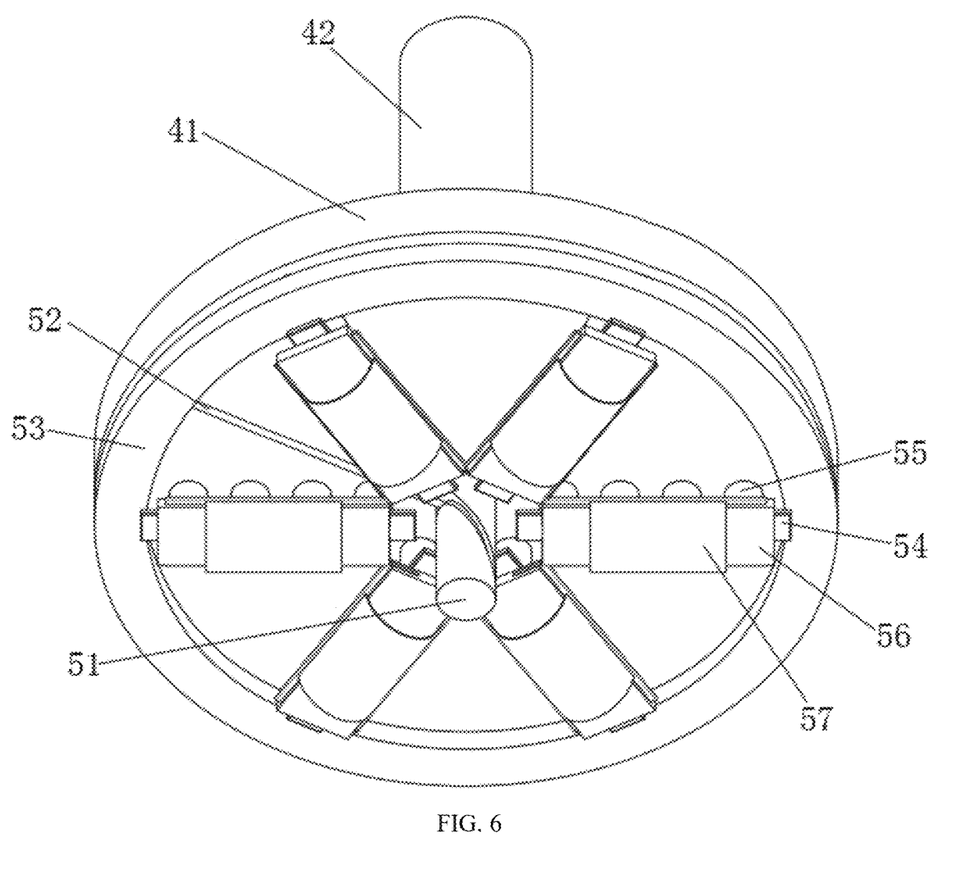
FIG. 6 is a schematic diagram of an anti-clogging device of the present disclosure.

The anti-clogging device 5 includes an arc groove column 51, a connecting rod 52 and a heating ring 53, where a top of the arc groove column 51 penetrates through and is fixedly mounted at the bottom of the electric telescopic rotating column 42, a right side of the connecting rod 52 is slidably mounted inside an arc groove of the arc groove column 51, an outer wall of the heating ring 53 is slidably mounted on the inner wall of the corresponding gas delivery pipe 3, and a concave surface of an inner wall of the heating ring 53 is fixedly mounted on a left side of the connecting rod 52. The crack detection device 6 for detecting quality of the material is arranged above an outer wall of the gas delivery pipe 3, and the heating ring 53 dynamically heats gas ejected from the gas delivery pipe 3 to accelerate a gas heating rate, and dries water vapor carried in the material by heat energy to prevent water droplets from adhering to the inner wall of the material so as to avoid increasing gas flow resistance and reducing detection accuracy.

Figure 7:
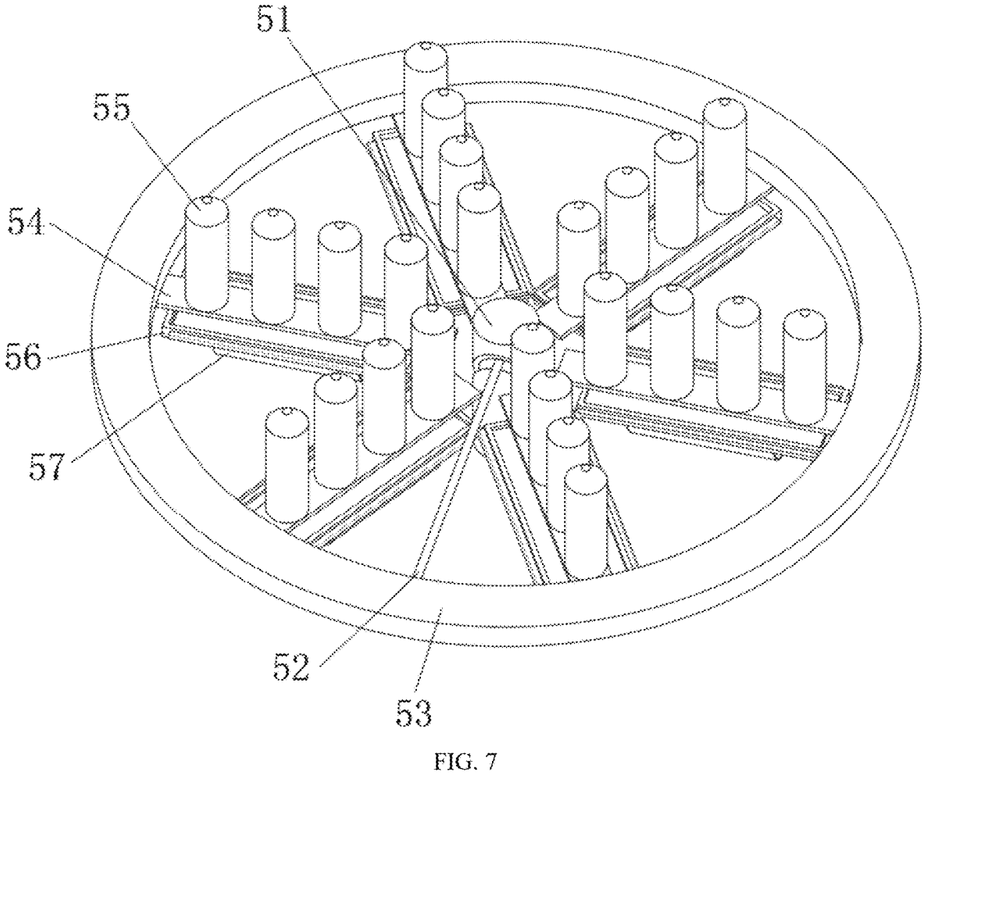
FIG. 7 is a schematic diagram of an anti-clogging device of the present disclosure from a top perspective.

The anti-clogging device 5 further includes fixed plates 54, conical blocks 55, telescopic bearing plates 56 and arc-shaped sheets 57, where a top of each of the fixed plates 54 is fixedly mounted at a bottom of the heating ring 53, a bottom of each of the conical blocks 55 is fixedly mounted on a top of the corresponding fixed plate 54, a top of each of the conical blocks 55 is directly opposite to a filter hole of the corresponding filter plate 41, a top of each of the telescopic bearing plates 56 is fixedly mounted at a bottom of the corresponding fixed plate 54, and a top of each of the arc-shaped sheets 57 is fixedly mounted at a bottom of a telescopic end of the corresponding telescopic bearing plate 56. The conical block 55 dredges the filter hole of the filter plate 41 through a conical surface to avoid reducing a gas flow aperture due to adhesion of dirt to the filter hole of the filter plate 41, the telescopic bearing plate 56 receives fallen dirt to prevent tiny dirt from entering the gas delivery pipe 3 through the filter plate 41 so as to avoid blockage of the gas delivery pipe 3, and a telescopic end of the telescopic bearing plate 56 rakes the dirt in a reciprocating manner.

Figure 8:
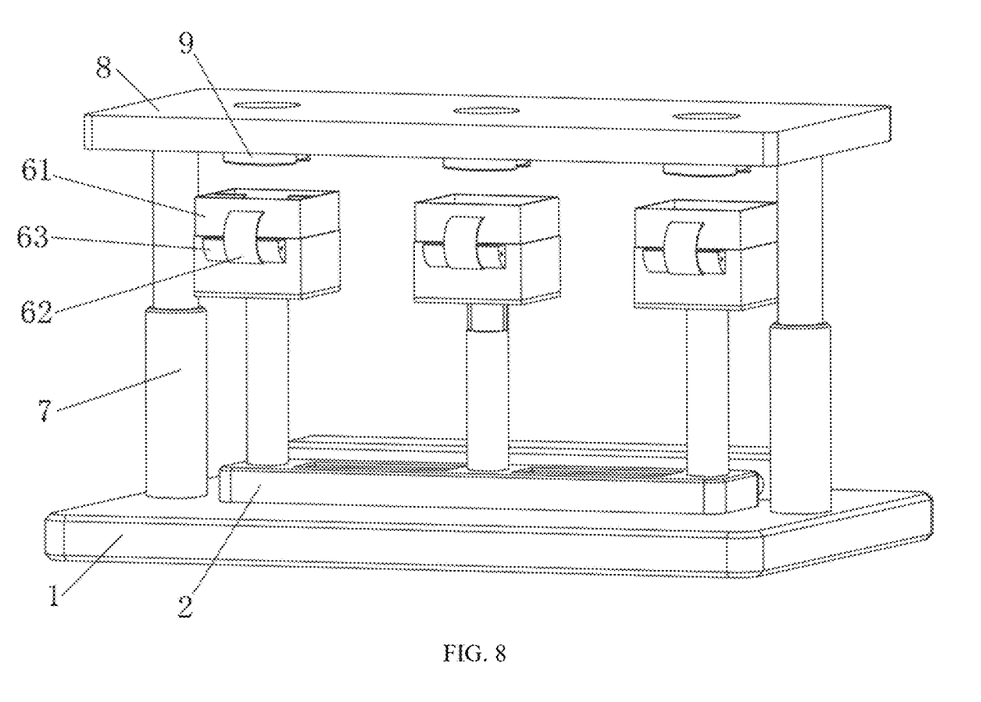
FIG. 8 is a schematic diagram of a crack detection device of the present disclosure.
Figure 9:
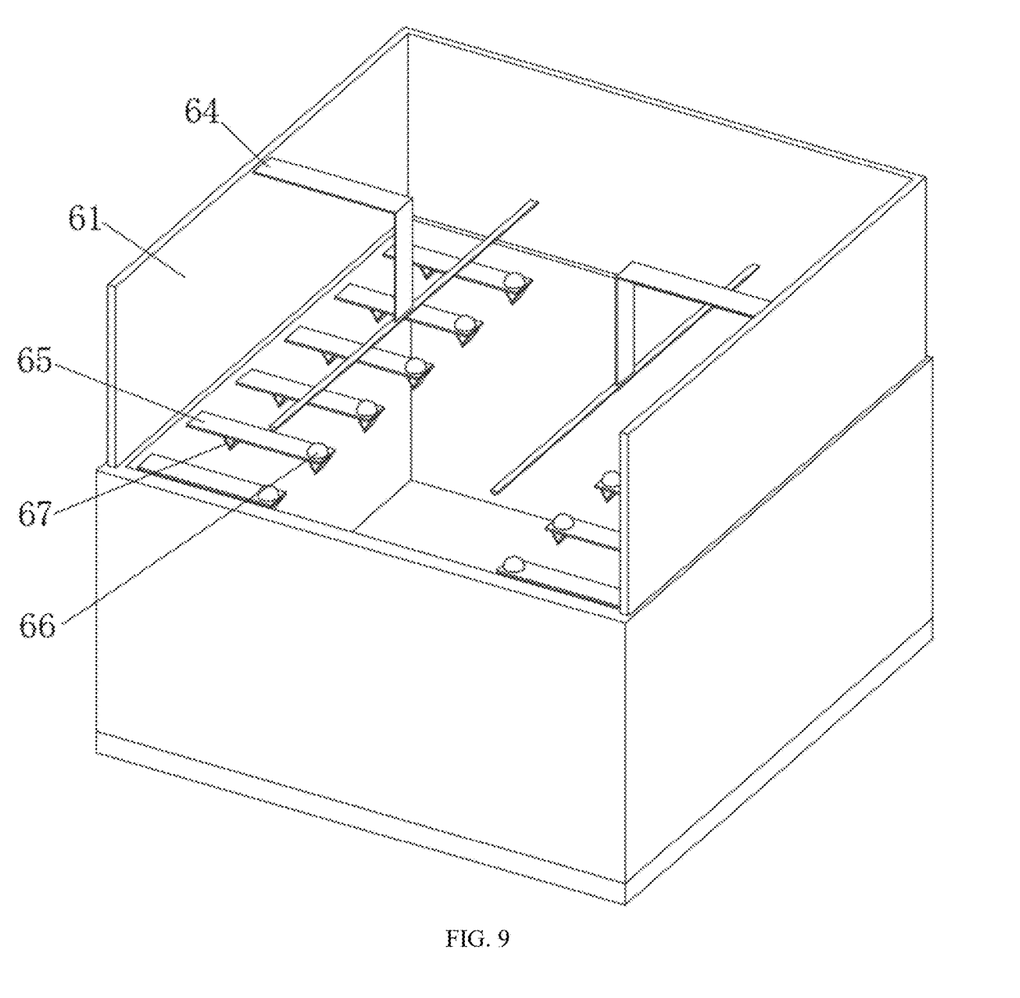
FIG. 9 is a sectional view of a crack detection device of the present disclosure.

The crack detection device 6 includes a telescopic housing 61, an elastic arc plate 62 and a purification capsule 63, where an inner wall of a bottom of the telescopic housing 61 is fixedly mounted above the outer wall of the corresponding gas delivery pipe 3, a telescopic end of the telescopic housing 61 is located on a motion trajectory of the pressing plate 8, the telescopic housing 61 is designed to be transparent, and the telescopic housing 61 is communicated with the gas delivery pipe 3. A back of the elastic arc plate 62 is fixedly mounted between a front face of the telescopic housing 61 and a front face of the telescopic end of the telescopic housing 61, and the purification capsule 63 is fixedly mounted between the front face of the telescopic housing 61 and a concave surface of the elastic arc plate 62. The pressing plate 8 abuts against the telescopic end of the telescopic housing 61 when descending to form a sealed environment, gas discharged from edges of the material is sensed, and whether gap leakage in the material is detected. At the time of resetting, the purification capsule 63 discharges purified gases such as ozone through an extrusion force to neutralize harmful gases generated by heat energy of the plastic parts.

The crack detection device 6 further includes L-shaped pressing levers 64, spoiler plates 65, vibration blocks 66 and angular blocks 67, where a left side of a top of each of the L-shaped pressing levers 64 is fixedly mounted on a left side of an inner wall of the telescopic end of the telescopic housing 61, a left side of each of the spoiler plates 65 is fixedly mounted on the left side of the inner wall of the telescopic housing 61, each of the spoiler plates 65 is located on a motion trajectory of the corresponding L-shaped pressing lever 64, a bottom of each of the vibration blocks 66 is fixedly mounted at a top edge of the corresponding spoiler plate 65, and a top of each of the angular blocks 67 is fixedly mounted at a bottom of the corresponding spoiler plate 65. When being reset, the spoiler plate 65 swings based on its own elasticity in a reciprocating manner, arrangement of the vibration blocks 66 enables to increase a swinging frequency of the spoiler plates 65, the spoiler plates 65 accelerate gas circulation inside the telescopic housing 61, and the angular block 67 dredges gas carrying water vapor and accumulated at a bottom of inside of the telescopic housing 61 due to temperature differences through angular inclined surfaces, which prevents long-time accumulation of the gas, thereby avoiding aggravated fermentation of harmful substances.

In use, the electric telescopic rotating column 42 drives the arc groove column 51 to rotate, the arc groove column 51 limits the connecting rod 52 through its own arc groove and causes the connecting rod 52 to move up and down, the connecting rod 52 drives the heating ring 53 to move synchronously, and the heating ring 53 dynamically heats gas ejected from the gas delivery pipe 3 to accelerate a gas heating rate, and dries water vapor carried in the material by heat energy to prevent water droplets from adhering to the inner wall of the material so as to avoid increasing gas flow resistance and reducing detection accuracy; the heating ring 53 drives the fixed plates 54 to move up and down, the fixed plates 54 drive the conical blocks 55 to move synchronously, the conical block 55 dredges the filter hole of the filter plate 41 through the conical surface to avoid reducing the gas flow aperture due to adhesion of dirt to the filter hole of the filter plate 41, and the conical blocks 55 ensure the smoothness of the filter plate 41; the fixed plate 54 drives the telescopic bearing plate 56 to move, and the telescopic bearing plate 56 receives fallen dirt to prevent tiny dirt from entering the gas delivery pipe 3 through the filter plate 41 so as to avoid blockage of the gas delivery pipe 3, thereby extending an equipment maintenance interval; and the telescopic bearing plate 56 drives the arc-shaped sheet 57 to move synchronously, the arc-shaped sheet 57 deforms due to an impact force of air pressure, the arc-shaped sheet 57, when moving upward, is reset based on its own elasticity due to reduction of the impact force in a reciprocating manner, the arc-shaped sheet 57 pulls the telescopic end of the telescopic bearing plate 56 to move from left to right, and the telescopic end of the telescopic bearing plate 56 rakes the dirt in a reciprocating manner, which avoids accumulating the dirt in a center thereof and reducing a volume of the telescopic bearing plate 56.

The pressing plate 8 abuts against the telescopic end of the telescopic housing 61 when descending to form a sealed environment, gas discharged from edges of the material is sensed, whether gap leakage in the material is detected, and the telescopic housing 61 blocks fragments generated from defective material bursting due to excessive pressure, thereby avoiding damage to vulnerable parts of the worker such as eyes; the telescopic housing 61, when retracting downward, compresses the elastic arc plate 62 to deform in a direction away from the telescopic housing 61, and an elastic force of the elastic arc plate 62 pushes the telescopic end of the telescopic housing 61 to reset automatically after the detection; the elastic arc plate 62, when deforming, pulls the purification capsule 63 to deform synchronously and store force, and at the time of resetting, the purification capsule 63 discharges purified gases such as ozone through an extrusion force to neutralize harmful gases generated by heat energy of the plastic parts, thereby avoiding harm to the respiratory system of the worker; the telescopic end of the telescopic housing 61 drives the L-shaped pressing lever 64 to move synchronously, and the L-shaped pressing lever 64 moves downward to abut against one end of the spoiler plate 65, which causes the abutted end of the spoiler plate 65 to bend downward and deform. When the L-shaped pressing lever 64 passes through the spoiler plate 65, the spoiler plate 65, when being reset, swings based on its own elasticity in a reciprocating manner, arrangement of the vibration blocks 66 enables to increase the swinging frequency of the spoiler plates 65, and the spoiler plates 65 accelerate gas circulation inside the telescopic housing 61, which accelerates neutralization of harmful gases and purified gases; and the spoiler plate 65 drives the angular block 67 to swing, and the angular block 67 dredges gas carrying water vapor and accumulated at a bottom of inside of the telescopic housing 61 due to temperature differences through angular inclined surfaces, which prevents long-time accumulation of the gas, thereby avoiding aggravated fermentation of harmful substances, and avoids aggravation of environmental pollution.

The foregoing descriptions are merely preferred specific embodiments of the present disclosure, and are not intended to limit the protection scope of the present disclosure. Any equivalent replacements or changes made by a person skilled in the art according to the technical solution of the present disclosure and the inventive concepts thereof within the technical scope disclosed in the present disclosure shall fall within the protection scope of the present disclosure.

The invention claimed is:

1. A ventilation test device for plastic parts of a coffee machine, comprising a device body, wherein a detection assembly is arranged at a center of a top of the device body, gas delivery pipes are equidistantly distributed on a top of the detection assembly, electric telescopic columns are arranged on left and right sides of the top of the device body, and a pressing plate is arranged on tops of telescopic ends of the electric telescopic columns; circular holes are formed in the pressing plate, telescopic rings are fixedly mounted at a bottom of the pressing plate, and the telescopic rings are located around peripheries of the circular holes; downstream devices for identifying ventilation types are arranged inside the gas delivery pipes;

each of the downstream devices comprises a filter plate, an electric telescopic rotating column, and an elliptical assembly, wherein an outer wall of the filter plate is fixedly mounted on an inner wall of the gas delivery pipe, a bottom of the electric telescopic rotating column is rotatably mounted at a center of a top of the filter plate, and a top arc surface of the elliptical assembly is hingedly connected to an outer wall surface of a telescopic end of the electric telescopic rotating column; the elliptical assembly is located directly below the corresponding circular hole of the pressing plate, and an anti-clogging device for preventing airflow obstruction is arranged below the filter plate;

the downstream device further comprises a twisted plate, an elastic ring, a transmission rod and a groove block, wherein a top of the twisted plate is fixedly mounted on a bottom arc surface of the elliptical assembly, inside of the elastic ring is slidably mounted on an outer wall of the electric telescopic rotating column, an outer wall of the elastic ring is fixedly connected to a bottom of the twisted plate, a bottom of the transmission rod is hingedly connected to a concave surface of the twisted plate, an arc surface of an outer wall of the groove block is hingedly connected to a top of the transmission rod, and a concave surface of an inner wall of the groove block is in contact with an outer wall of the telescopic end of the electric telescopic rotating column;

the anti-clogging device comprises an arc groove column, a connecting rod and a heating ring, wherein a top of the arc groove column penetrates through and is fixedly mounted at the bottom of the electric telescopic rotating column, a right side of the connecting rod is slidably mounted inside an arc groove of the arc groove column, an outer wall of the heating ring is slidably mounted on the inner wall of the corresponding gas delivery pipe, a concave surface of an inner wall of the heating ring is fixedly mounted on a left side of the connecting rod, and a crack detection device for detecting quality of the material is arranged above an outer wall of the gas delivery pipe;

the anti-clogging device further comprises fixed plates, conical blocks, telescopic bearing plates and arc-shaped sheets, wherein a top of each of the fixed plates is fixedly mounted at a bottom of the heating ring, a bottom of each of the conical blocks is fixedly mounted on a top of the corresponding fixed plate, a top of each of the conical blocks is directly opposite to a filter hole of the corresponding filter plate, a top of each of the telescopic bearing plates is fixedly mounted at a bottom of the corresponding fixed plate, and a top of each of the arc-shaped sheets is fixedly mounted at a bottom of a telescopic end of the corresponding telescopic bearing plate;

the crack detection device comprises a telescopic housing, an elastic arc plate and a purification capsule, wherein an inner wall of a bottom of the telescopic housing is fixedly mounted above the outer wall of the corresponding gas delivery pipe, a telescopic end of the telescopic housing is located on a motion trajectory of the pressing plate, the telescopic housing is designed to be transparent, and the telescopic housing is communicated with the gas delivery pipe; a back of the elastic arc plate is fixedly mounted between a front face of the telescopic housing and a front face of the telescopic end of the telescopic housing, and the purification capsule is fixedly mounted between the front face of the telescopic housing and a concave surface of the elastic arc plate; and the crack detection device further comprises L-shaped pressing levers, spoiler plates, vibration blocks and angular blocks, wherein a left side of a top of each of the L-shaped pressing levers is fixedly mounted on a left side of an inner wall of the telescopic end of the telescopic housing, a left side of each of the spoiler plates is fixedly mounted on the left side of the inner wall of the telescopic housing, each of the spoiler plates is located on a motion trajectory of the corresponding L-shaped pressing lever, a bottom of each of the vibration blocks is fixedly mounted at a top edge of the corresponding spoiler plate, and a top of each of the angular blocks is fixedly mounted at a bottom of the corresponding spoiler plate.

2. The ventilation test device for plastic parts of a coffee machine according to claim 1, wherein annular inclined plates are arranged on a top of the pressing plate, the annular inclined plates are distributed around peripheries of tops of the circular holes, a U-shaped frame is hingedly connected to a top of an inclined plate in each of the annular inclined plates, a friction wheel is rotatably mounted inside the U-shaped frame, and spring plates are arranged on an inclined surface of the inclined plates in each of the annular inclined plates and at edges of the corresponding circular hole on the top of the pressing plate.

3. A test method for the ventilation test device for plastic parts of a coffee machine according to claim 2, comprising the following steps:
- S1: putting the material into the corresponding circular hole on the top of the pressing plate, and activating the electric telescopic columns, such that the telescopic ends of the electric telescopic columns drive the pressing plate and the material to descend;
- S2: enabling the material to abut against the spring plate when passing through the circular hole of the pressing plate, wherein the material continues to descend after the spring plate deforms;
- S3: activating the detection assembly when the material descends to the gas delivery pipe, wherein the detection assembly delivers gas to inside of the gas delivery pipe and displays a value; and
- S4: driving the pressing plate to move upward when the telescopic end of the electric telescopic column rises after the ventilation, wherein the spring plate carries the material away from the gas delivery pipe to complete the detection.

* * * * *